United States Patent
Hamanaka (10) Patent No.: US 8,705,376 B2
(45) Date of Patent: Apr. 22, 2014

(54) IMAGE PROCESSING DEVICE AND IMAGE PROCESSING METHOD

(75) Inventor: Akiyoshi Hamanaka, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 1147 days.

(21) Appl. No.: 11/993,550

(22) PCT Filed: Jun. 12, 2006

(86) PCT No.: PCT/JP2006/312192
§ 371 (c)(1),
(2), (4) Date: Dec. 21, 2007

(87) PCT Pub. No.: WO2007/000908
PCT Pub. Date: Jan. 4, 2007

(65) Prior Publication Data
US 2010/0158119 A1    Jun. 24, 2010

(30) Foreign Application Priority Data

Jun. 29, 2005  (JP) ................................. 2005-189939

(51) Int. Cl.
*H03K 9/00*    (2006.01)

(52) U.S. Cl.
USPC .......................................... 370/243; 375/316

(58) Field of Classification Search
USPC ............... 375/240.16, 240.01, 243, 295, 316; 370/230, 235
See application file for complete search history.

(56) References Cited

U.S. PATENT DOCUMENTS

| | | | |
|---|---|---|---|
| 5,555,266 A * | 9/1996 | Buchholz et al. | 370/347 |
| 5,561,532 A | 10/1996 | Ohnishi et al. | 386/47 |
| 5,617,143 A | 4/1997 | Shimokoriyama et al. | 348/407 |
| 5,680,322 A * | 10/1997 | Shinoda | 714/18 |
| 6,327,391 B1 | 12/2001 | Ohnishi et al. | 382/236 |
| 6,778,605 B1 * | 8/2004 | Hamanaka | 375/240.16 |
| 2002/0075897 A1* | 6/2002 | Koo et al. | 370/466 |
| 2003/0009746 A1 | 1/2003 | Krishnan | 717/135 |

FOREIGN PATENT DOCUMENTS

| | | |
|---|---|---|
| CN | 1515119 A | 7/2004 |
| JP | H 7-322248 A | 12/1995 |
| JP | H 11-27645 A | 1/1999 |
| JP | 11-331839 | 11/1999 |
| JP | 2004-529596 | 9/2004 |
| JP | 2005-167720 | 6/2005 |
| WO | WO 02/102083 | 12/2002 |

* cited by examiner

*Primary Examiner* — Yemane Mesfin
*Assistant Examiner* — Mon Cheri Davenport
(74) *Attorney, Agent, or Firm* — Fitzpatrick, Cella, Harper & Scinto (57) ABSTRACT

It aims to provide the technique capable of reducing the process to be executed on the reception side and shortening the time from the occurrence of an error to the sending of a retransmission request. To achieve this, the image data is encoded in units of block by the encoding unit, the reference information representing whether or not the block is referred when another block is encoded is generated by the reference map generation unit, and then the encoded block and the reference information are transmitted by the transmission unit.

3 Claims, 8 Drawing Sheets

☒ ERROR-OCCURRED BLOCK
☒ ERROR-TRANSFERRED BLOCK

IMAGE PROCESSING DEVICE AND IMAGE PROCESSING METHOD

TECHNICAL FIELD

The present invention relates to encoding and decoding of digital image data.

BACKGROUND ART

In a conventional digital moving image communication system, in a case where an error packet is received at the reception side, the reception side sends to the transmission side a retransmission request in relation to a part (i.e., block, slice, or the like) which could not correctly be decoded due to such an error. Then, the transmission side which received the retransmission request from the reception side retransmits to the reception side the encoded data corresponding to the retransmission-requested part which could not correctly be decoded.

Moreover, on the reception side, the number of times of retransmission, a loss factor of information, an interval of inserting an intra-frame encoded frame, and the like are set as the parameters, and retransmission request priority for setting a threshold value is determined based on any of the parameters. Then, in regard to the part which could not correctly be decoded, it is determined on the reception side whether or not to send the retransmission request by judging the set threshold value with an arbitrary criterion.

Meanwhile, on the transmission side, there is provided a retransmission priority determination unit which sets the number of times of retransmission, the loss factor of information, the interval of inserting the intra-frame encoded frame, and the like as parameters, and sets a threshold value based on any of the parameters. Then, in a case where the retransmission request sent from the reception side is received, the transmission side determines the process (whether or not to execute retransmission) in response to the retransmission request sent from the reception side by judging the threshold value set by the retransmission priority determination unit with an arbitrary criterion. That is, conventionally, the retransmission control to be executed on the reception side is independent of the retransmission control to be executed on the transmission side.

In the conventional digital moving image communication system, the priority order concerning retransmission request of moving image frames or the blocks constituting the frames are set independently on the transmission side and the reception side, and the transmission side and the reception side operate independently. For this reason, there is a problem that the loads increase on both the transmission side and the reception side.

In particular, if an error is detected on the reception side, it is determined whether or not to execute the retransmission request after calculating and evaluating the priority order, importance and the like of the point where the relevant error occurred. For this reason, there is a problem that it takes a time from the error detection to the judgment as to whether or not to execute the retransmission request.

DISCLOSURE OF THE INVENTION

The present invention has come to completion in consideration of the above conventional problems, and an object thereof is to provide the technique capable of reducing the processes to be executed on the reception side and thus shortening the time from error occurrence to sending of a retransmission request.

To achieve the above object, the present invention is characterized by an image processing device which comprises: an encoding unit adapted to encode image data in units of block; a generation unit adapted to generate reference information representing whether or not the block is referred when another block is encoded; and an output unit adapted to output the encoded block and the reference information.

Moreover, the present invention is characterized by an image processing method which comprises: an encoding step of encoding image data in units of block; a generation step of generating reference information representing whether or not the block is referred when another block is encoded; and a transmission step of transmitting the encoded block and the reference information.

Other objects, characteristics and advantages of the present invention will become apparent from the following detailed description taken in conjunction with the accompanying drawings.

BEST MODE FOR CARRYING OUT THE INVENTION

Hereinafter, the embodiments of the present invention will be explained in detail with reference to the attached drawings.
(First Embodiment)

The processes to be executed by the encoding device and on the encoding side (i.e., transmission side) according to the present embodiment will be explained with reference to FIGS. 1, 3A, 3B, 5 and 6.

Figure 1:
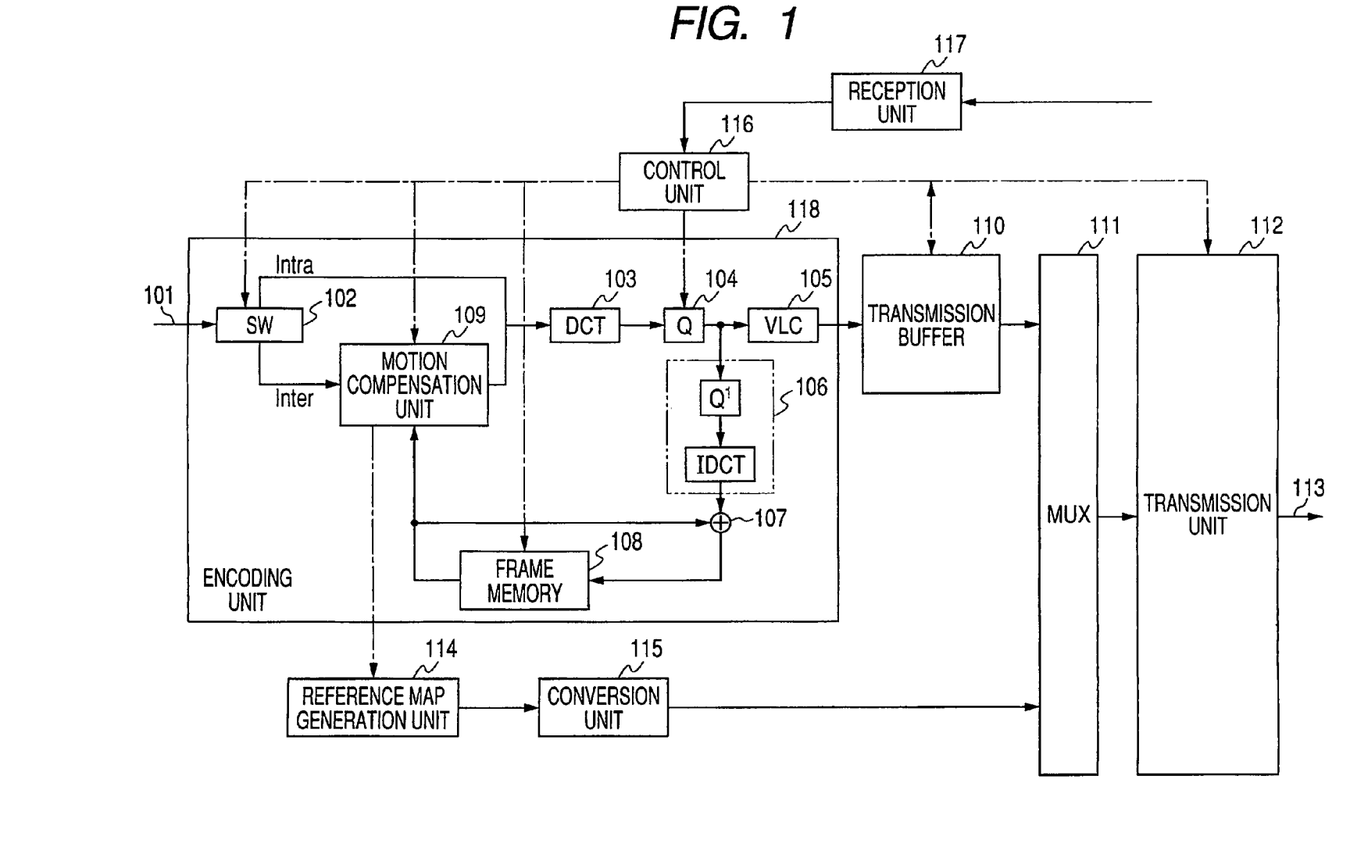
FIG. 1 is a functional block diagram showing the encoding device according to the embodiment of the present invention.

FIG. 1 is the functional block diagram showing the encoding device according to the embodiment of the present invention. In FIG. 1, numeral 118 denotes an encoding unit which contains a changeover switch (SW) 102, a discrete cosine transform (DCT) unit 103, a quantization (Q) unit 104, a variable length coding (VLC) unit (or a variable length encoding unit) 105, a local decoding unit 106, an adder 107, a frame memory 108, and a motion compensation unit 109. Numeral 101 denotes an input terminal, numeral 110 denotes a transmission buffer (frame memory), numeral 111 denotes a multiplexer (MUX), numeral 112 denotes a transmission unit, numeral 113 denotes a transmission data output terminal, numeral 114 denotes a reference map generation unit, numeral 115 denotes a conversion unit (to be used for a reference map), numeral 116 denotes a control unit, and numeral 117 denotes a reception unit.

Figure 3A:
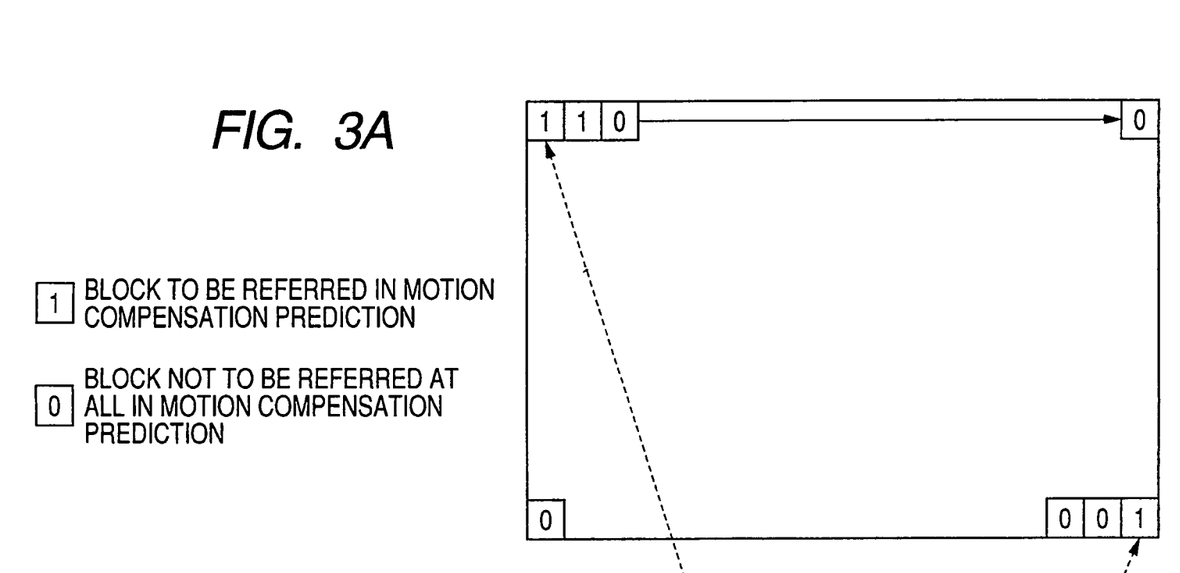
FIG. 3A is a diagram showing an example of the reference map according to the embodiment of the present invention.
Figure 3B:
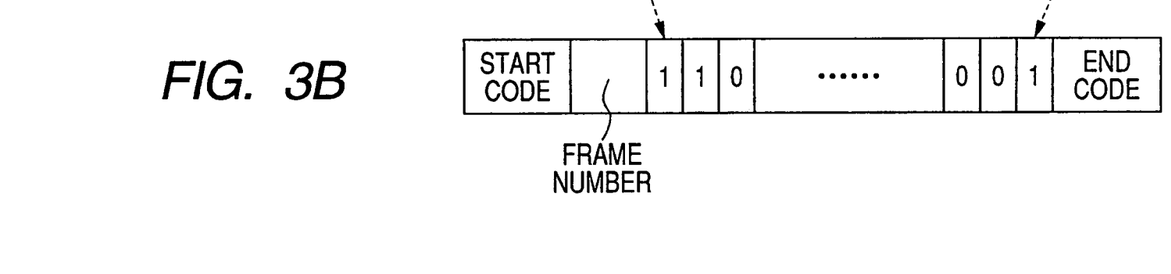
FIG. 3B is a diagram showing an example of the transmission format according to the embodiment of the present invention.

FIG. 3A is the diagram showing the reference map which is to be referred in units of block in an arbitrary frame generated by the reference map generation unit 114, and FIG. 3B is the diagram showing the data constitution which is acquired by converting the reference map of FIG. 3A from the upper left thereof by the conversion unit 115 so as to acquire the format suitable for transmission.

Incidentally, in FIG. 3A, symbol "1" indicates the reference block which is referred in motion compensation prediction, and symbol "0" indicates the reference block which is not referred at all in the motion compensation prediction.

Figure 5:
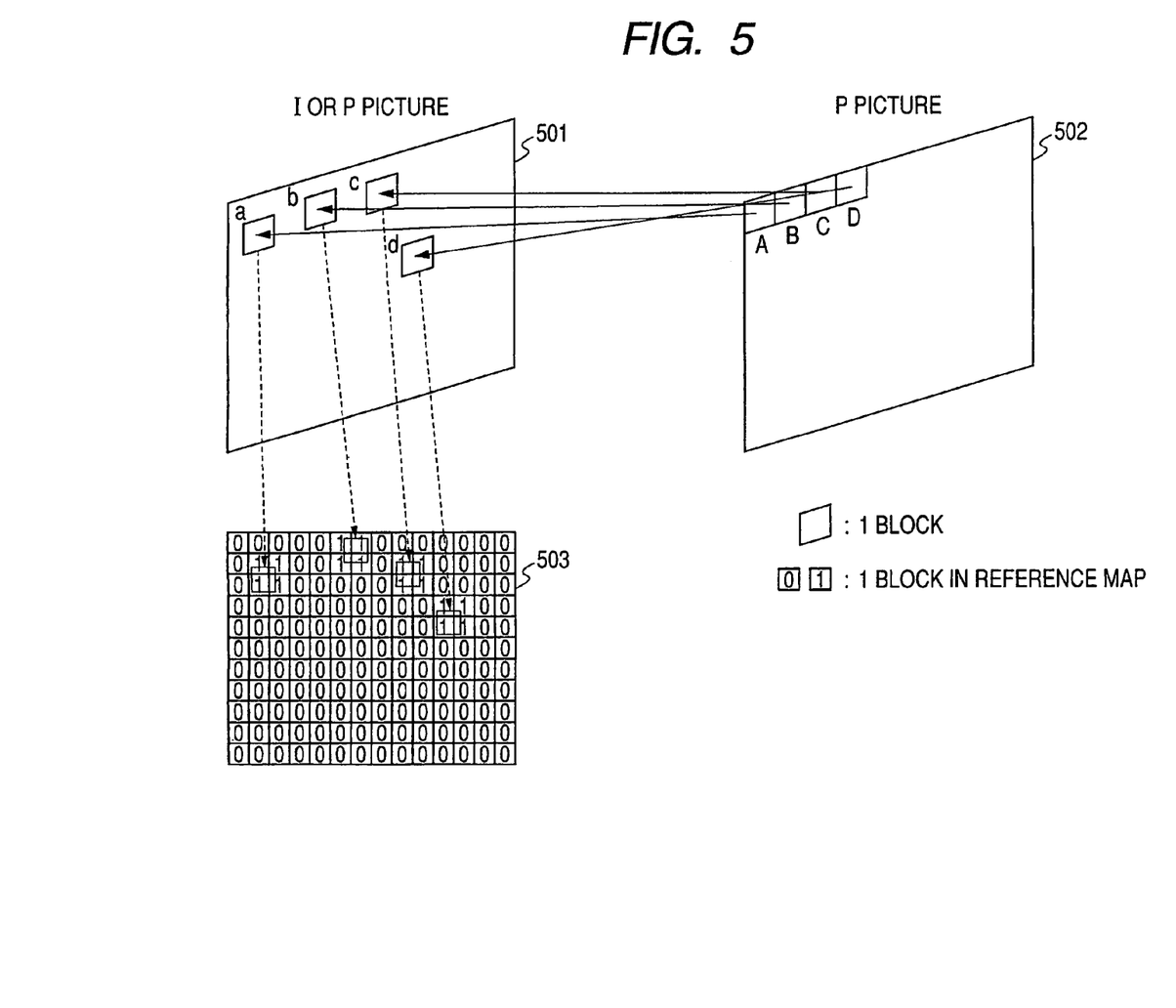
FIG. 5 is a diagram for explaining the process of generating the reference map according to the embodiment of the present invention.

FIG. 5 is the diagram for explaining the process of generating a reference map according to the embodiment of the present invention. More specifically, FIG. 5 shows the relation of an encoding target frame 502 at a certain point of time, a reference frame 501 to be referred by the encoding target frame 502 in the motion compensation prediction, and a reference map 503 corresponding to the reference frame 501.

Figure 6:
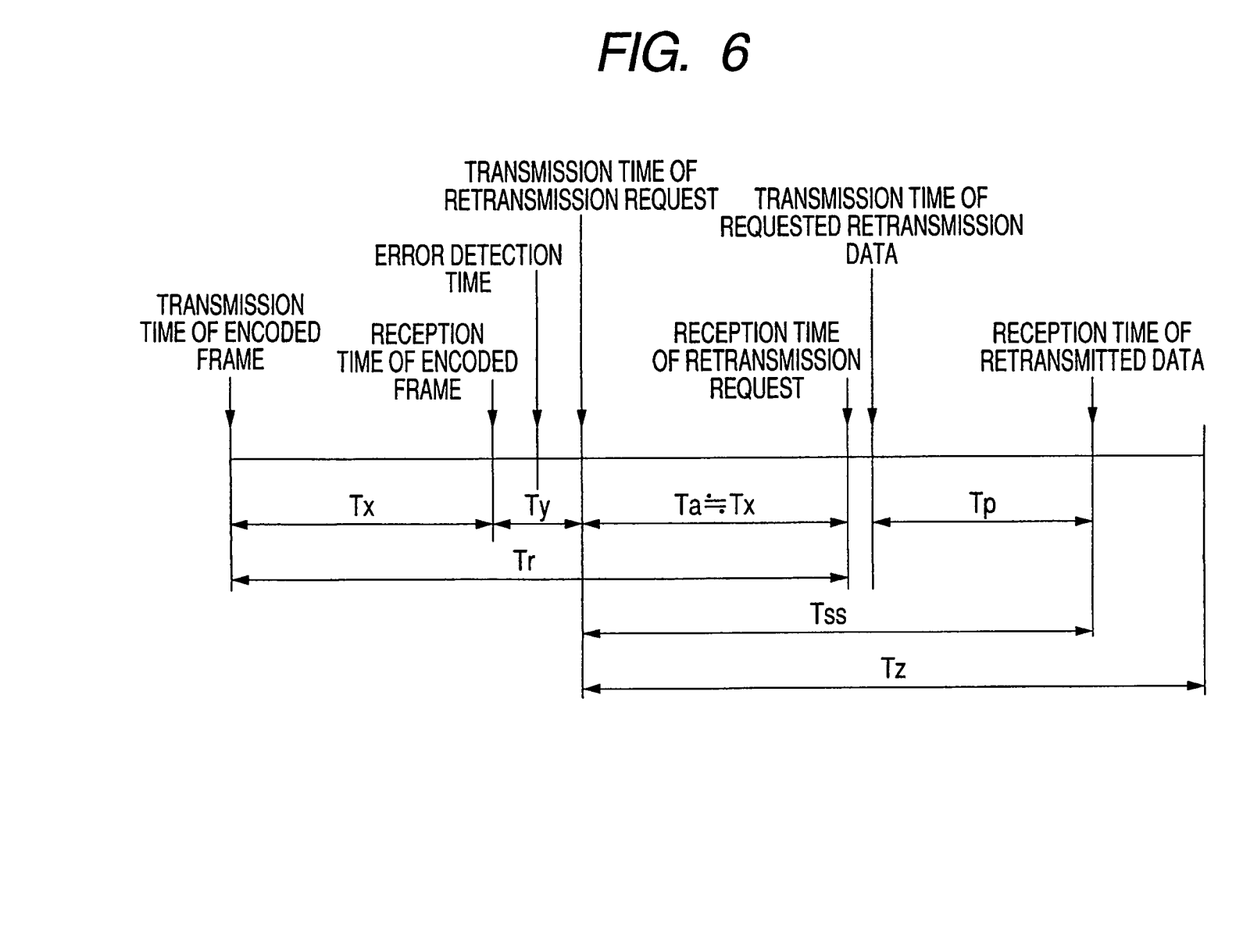
FIG. 6 is a time chart to be used to judge whether or not to execute the retransmission corresponding to the retransmission request, according to the embodiment of the present invention.

FIG. 6 is the time chart showing the times necessary to judge whether or not to execute the retransmission corresponding to the retransmission request received from the reception side.

Subsequently, the process to be executed on the encoding side (transmission side) will be explained.

In FIG. 1, a digital moving image signal is first input to the SW 102 through the input terminal 101. Here, it should be noted that the encoding mode of the input digital moving image signal (frame) is determined by the SW 102 under the later-described control of the control unit 116, and the determined encoding mode is reflected in the changeover direction of the SW 102 (that is, "Intra" or "Inter" as shown in FIG. 1).

In a case where the encoding mode for the frame is set to inter-frame encoding (P frame or B frame), the SW 102 is switched to the side ("Inter") of the motion compensation unit 109. For this reason, the digital moving image signal input from the input terminal 101 is then transferred to the motion compensation unit 109 through the SW 102.

Then, the digital moving image signal (encoding target frame) input to the motion compensation unit 109 is subjected to a motion vector search process in relation to the later-described reference frame stored in the frame memory 108, and a difference value between the encoding target frame and the reference frame is calculated according to the searched motion vector. Subsequently, the calculated difference value is input to the DCT unit 103 as a difference moving image signal.

Here, it should be noted that the reference frame is the frame which was encoded previous to the current encoding target frame, decoded (in a local encoding manner), and has been stored in the frame memory 108.

On the other hand, in a case where the encoding mode for the frame is set to intra-frame encoding (I frame), the SW 102 is switched to the side ("Intra") of bypassing the motion compensation unit 109 under the control of the control unit 116. For this reason, the digital moving image signal input from the input terminal 101 is then transferred to the DCT unit 103 through the SW 102, substantially in the same manner as that in case of the inter-frame encoding.

Here, in a case where intra-frame prediction (that is, the prediction to be executed between the blocks in the same frame) is executed, it is assumed that, even in the intra-frame encoding, the process is executed in the motion compensation unit 109 as well as in the inter-frame encoding. Here, it should be noted that intra-frame prediction encoding implies the case where the pixel to be used for the prediction belongs to the frame same as the frame to which the pixel intended to be encoded belongs. Meanwhile, it should be noted that inter-frame prediction encoding implies the case where the pixel to be used for the prediction belongs to the frame different from the frame to which the pixel intended to be encoded belongs.

In the motion compensation unit 109, a motion compensation prediction process is executed for the encoding (compression). In addition, at the same time, the reference information of each block of the frame which was referred in the motion compensation prediction process is output to the reference map generation unit 114. Then, in the reference map generation unit 114, the reference map in units of each block constituting each reference frame is generated based on the reference information transferred from the motion compensation unit 109.

Subsequently, the process of generating the reference map will be explained with reference to FIG. 5. In the encoding target frame as shown in FIG. 5, it is assumed that the motion vector search process is executed in the order of raster scanning beginning from the upper left block. However, it should be noted that, basically, such order can be arbitrarily determined.

The reference frame corresponding to the encoding target frame is the frame which was precedently encoded and locally decoded in the encoding order and has been stored in the frame memory 108. More specifically, in the MPEG-1 (Motion Picture Experts Group-1) system, the MPEG-2 system or the like, the reference frame is the frame immediately before the encoding target frame (in encoding order). Besides, in the H.264 system, all the precedent frames of the encoding target frame are the reference target frames.

First of all, in FIG. 5, a case where the motion vector search is executed to the block A located at the upper left of the encoding target frame 502 is executed, and then the motion vector in regard to the block A resultingly indicates the area shown by "a" on the reference frame 501 will be explained. More specifically, the information of the motion vector in regard to the block A is output from the motion compensation unit 109 and input to the reference map generation unit 114.

The reference map 503 which is acquired by dividing each frame in units of block has been prepared in the reference map generation unit 114, and the index of one bit is allocated to each block on the reference map 503. Here, it is assumed that the default value of the index is "0".

If the information of the motion vector is input to the reference map generation unit 114, the area indicated by the motion vector is calculated, and the index of the block corresponding to the area indicated by the calculated motion vector on the reference map is set to "1".

In the same manner, the above process is executed to the blocks B, C and D of the encoding target frame, and thus to all the blocks within the encoding target frame in raster scanning order. Therefore, the reference map is generated in parallel with the process of the conventional motion prediction encoding process, and then the whole processes end.

The (difference) moving image signal which was output from the motion compensation unit 109 and then input to the DCT unit 103 is subjected to an orthogonal transformation process. Subsequently, the acquired data is input to the quantization unit 104 as an orthogonal transformation coefficient.

In regard to the orthogonal transformation coefficient which was input to the quantization unit 104, a quantization coefficient (or a scale) is selected under the control of the control unit 116. Then, quantization calculation is executed in regard to the orthogonal transformation coefficient, and the acquired data is output to the VLC unit 105 and the local decoding unit 106 as a quantization orthogonal transformation coefficient. Here, it should be noted that, the quantization calculation is the calculation for acquiring the quotient of each orthogonal transformation coefficient and the corresponding quantization coefficient.

Then, a variable length code (that is, an entropy code) according to appearance probability is allocated to the quantization orthogonal transformation coefficient which was input to the VLC unit 105, and the acquired quantization orthogonal transformation is stored on the transmission buffer 110 as an encoded frame.

According to the present embodiment, in order to synchronize with the later-described reference map, the transmission buffer 110 secures the capacity of {(N×2)+1} frames or more in a case where the distance between the encoding target frame and the reference frame is assumed to be "N" in each encoding format. For this reason, it is possible to promptly cope with the retransmission request sent from the reception side.

Besides, it should be noted that the transmission buffer 110 in the present embodiment is the storage unit of ring buffer type. Therefore, when new data is to be written, the relevant data is overwritten on the oldest stored data.

The quantization orthogonal transformation coefficient which was input to the local decoding unit 106 is subjected to the inverse operation (i.e., inverse quantization) as opposed to the quantization executed by the quantization unit 104 and to the inverse operation (i.e., inverse orthogonal transformation) as opposed to the orthogonal transformation executed by the DCT unit 103. Subsequently, the acquired data is output to the adder 107 as the decoded moving image signal (or a decoded difference moving image signal) in regard to the encoding target frame.

In a case where the encoding mode of the encoding target frame is directed to the intra-frame encoding, the adder 107 passes through addition calculation (or adds zero to all the pixel values), and outputs the local encoded frame. Subsequently, a case where the encoding mode of the encoding target frame is directed to the inter-frame prediction encoding or the intra-frame prediction encoding will be explained. That is, in this case, the corresponding reference frame (or block) is read from the frame memory 108 in accordance with the motion vector corresponding to each block of the encoding target frame searched by the motion compensation unit 109, the read reference frame is added to the decoded difference motion image signal which was output from the local decoding unit 106, and the acquired data is output from the adder 107 as a local decoded frame. Subsequently, the local decoded frame which was output from the adder 107 is stored in the frame memory 108 as the reference frame for the motion compensation prediction process.

At a time when the encoding process to all the blocks in the encoding target frame 502 ends, the generation of the reference map (see FIG. 3A) in regard to the reference frame ends.

The reference map which was generated by the reference map generation unit 114 is then input to the conversion unit 115. In the conversion unit 115, for example, as shown in FIG. 3B, the start code (of arbitrary bit number) is first added to the head, the frame number for discriminating the corresponding frame and the index corresponding to each block of the reference map are subsequently added. Here, it should be noted that, with respect to the index corresponding to each block, the order of blocks is arbitrary in principle. However, the blocks are generally arranged in raster scanning order, zigzag scanning order, or the like. Then, the end code (of arbitrary bit number) is finally added, and the packet of format suitable for transmission data is generated.

The packet reference map is output from the conversion unit 115 and then input to the MUX 111. At the same time, under the control of the control unit 116, the encoded frame corresponding to the packet reference map which was input to the MUX 111 is read from the transmission buffer 110, and the read encoded frame is input to the MUX 111. Subsequently, the encoded frame and the corresponding reference map are subjected to multiplexing, and the input to the transmission unit 112.

In the present embodiment, it is possible to multiplex the reference map with another encoded frame so as to avoid a problem that errors occur simultaneously in the reference map and the encoded frame. Moreover, it is also possible to independently transmit the reference map by using a transmission path (a dedicated line or the like) different from the transmission path for the encoded frame.

Under the control of the control unit 116, the transmission unit 112 converts the multiplexed encoded frame and reference map into the format (e.g., a transport stream, an arbitrary file format, or the like) suitable for transmission, in accordance with a predetermined format. After then, the transmission unit 112 can transmit the data from the output terminal 113 to the reception side through the transmission path.

Subsequently, the reception unit 117 receives and extracts the information which was transmitted from the reception side and represents the retransmission request due to an error, the state of the transmission path (e.g., a line capacity, an error rate or the like), and then inputs the extracted information to the control unit 116. When the retransmission request of the specific block (or frame) is received from the reception terminal, the reception unit 117 outputs the information for specifying the block (or frame) corresponding to the retransmission request to the control unit 116.

In response to the information representing the target block (or frame) of which the retransmission is requested from the reception side, the control unit 116 selects the data corresponding to the block (or frame) of the retransmission request target from the transmission buffer 110, and retransmits the relevant block (or frame) to the reception side through the transmission unit 112 and the output terminal 113.

At that time, if the data corresponding to the block (or frame) of the retransmission request target does not exist in the transmission buffer 110, the control unit 116 discards the received retransmission request, whereby any retransmission is not executed.

It should be noted that, in the first embodiment of the present invention, the specification of an average receiver is assumed. Under the circumstances, 1) a prediction necessary time (Tx) from the first transmission of the encoded frame to the reception of the transmitted frame on the reception side, and 2) a prediction necessary time (Ty) from the reception of the encoded frame at the time of error occurrence to the sending of the retransmission request based on the error detection are calculated.

In this connection, by calculating the above 1) and 2), the capacity of the transmission buffer 110 is set to have the capacity capable of holding the encoded frame as long as the period of time equal to or longer than the time {(2×Tx)+Ty} beginning from the time when the encoded frame is first transmitted.

Moreover, the transmission buffer 110 and the frame memory 108 can be made common, and thus the capacity thereof can be dynamically changed according to need. In this regard, it is desirable for the control unit 116 to dynamically calculate the values of the above 1) and 2) at an arbitrary time interval.

In addition to the functions as described above, the control unit 116 has the function to acquire the information of the traffics (an effective speed, a capacity, and the like) of the transmission path through which the data was received by the reception unit 117, and control the quantization unit 104 based on the acquired information, thereby controlling a generated code amount in units of block or frame.

More specifically, the control unit 116 controls observation, writing and reading of the number of encoded frames and the frame numbers stored in the transmission buffer 110. Further, the control unit 116 controls observation, writing and reading of the number of reference frames and the frame numbers stored in the frame memory 108.

Figure 7A:
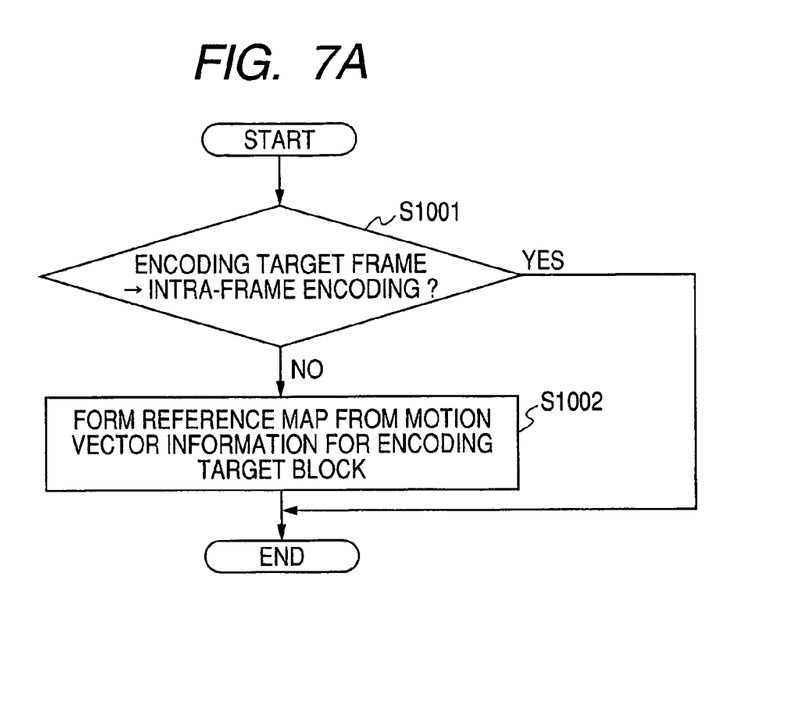
FIG. 7A is a flow chart showing the process of generating the reference map in the encoding device according to the embodiment of the present invention.

FIG. 7A is a flow chart showing the process of generating the reference map in the encoding device according to the present embodiment.

In FIG. 7A, initially, it is judged in a step S1001 whether or not the encoding target frame is to be subjected to the intra-frame encoding. In other words, it is judged in this step whether or not the encoding target frame refers to another frame or block. In any case, if "NO" in the step S1001, the flow advances to a step S1002. In the step S1002, as already explained for the operation of the reference map generation unit 114, the reference map is generated based on the motion vector information in regard to the encoding target block. On the other hand, if "YES" in the step S1001, the process ends as it is.

Figure 7B:
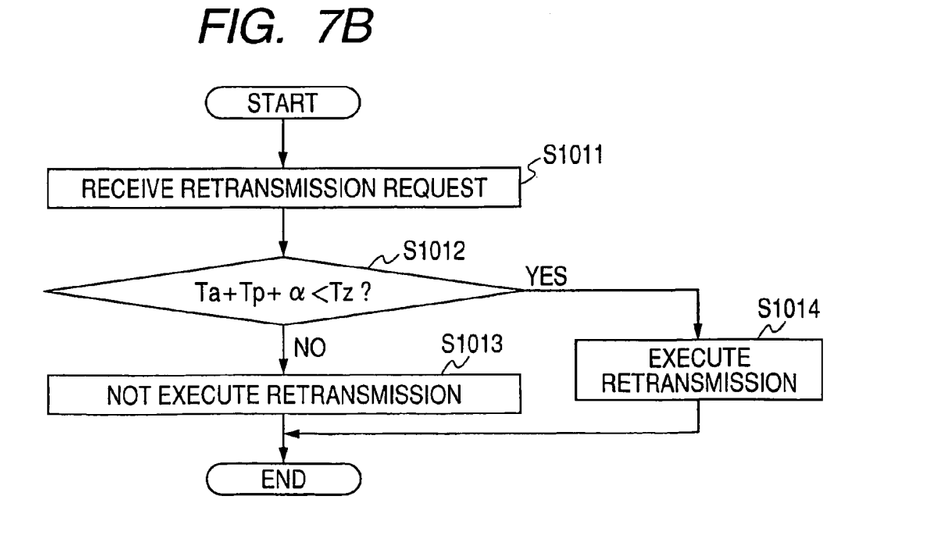
FIG. 7B is a flow chart showing the process to be executed in response to the retransmission request.

FIG. 7B is a flow chart showing the process to be executed in response to the retransmission request in the encoding device according to the present embodiment.

In FIG. 7B, initially, the retransmission request is received in a step S1011.

Further, an actual time (Tr) from the transmission of the encoded frame from the output terminal 113 to the reception of the retransmission request corresponding to the encoded frame is measured with respect to each encoded frame. Then, a time (Tp), a time (Ta) and a time (Tz) are predicted based on the measured actual time (Tr). Here, the time (Tp) is the time from the transmission of the retransmission data to be retransmitted hereafter to the reception of the transmitted retransmission data on the reception side, and the time (Ta) is the time from the sending of the retransmission request on the reception side to the reception of the sent retransmission request on the transmission side. Further, the time (Tz) is the maximum time from the sending of the retransmission request on the reception side to the reception of the retransmission data on the reception side, that is, the maximum time by which it is possible to be in time for a regular display time even if the retransmission data is decoded.

Then, it is judged in a step S1012 whether or not the condition by the expression (1) can be satisfied (see FIG. 6).

$$Ta+Tp+\alpha<Tz \tag{1}$$

If it is judged in the step S1012 that the condition by the expression (1) can be satisfied, it is discriminated that the retransmission data is decoded on the reception side in correct order. Thus, the retransmission is executed according to the retransmission request (step S1014).

On the other hand, if it is judged in the step S1012 that the condition by the expression (1) cannot be satisfied, it is discriminated that the retransmission data is not correctly decoded or displayed on the reception side because, for example, the relevant data is discarded. Thus, the retransmission request is discarded, and the retransmission is not executed (step S1013).

Subsequently, the decoding device and the process to be executed on the decoding side (reception side), according to the present embodiment, will be explained with reference to FIGS. 2, 4A, 4B and 8.

Figure 2:
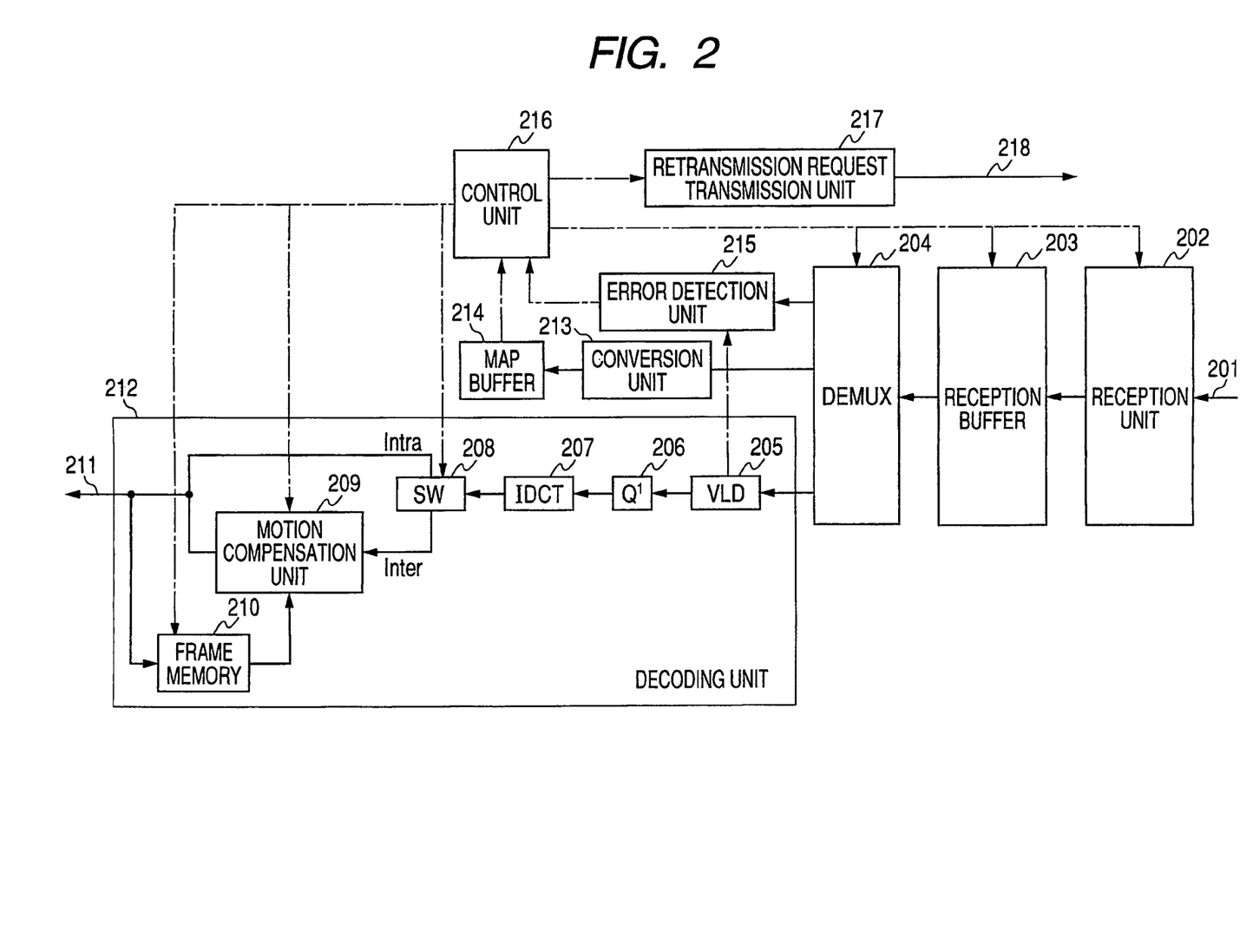
FIG. 2 is a functional block diagram showing the decoding device according to the embodiment of the present invention.

In FIG. 2, numeral 212 denotes a decoding unit. Moreover, in the decoding unit 212, numeral 205 denotes a variable length decoding (VLD) unit, numeral 206 denotes an inverse quantization ($Q^1$) unit, numeral 207 denotes an inverse orthogonal transformation {or inverse discrete cosine transformation (IDCT)} unit, numeral 208 denotes a changeover switch (SW), numeral 209 denotes a motion compensation unit, and numeral 210 denotes a frame memory. Besides, numeral 201 denotes a reception data input terminal, numeral 202 denotes a reception unit, numeral 203 denotes a reception buffer (frame memory), numeral 204 denotes a demultiplexer (DEMUX) (or a multiplexing release unit), numeral 211 denotes a decoded image data output terminal, numeral 213 denotes a conversion unit, numeral 214 denotes a map buffer, numeral 215 denotes an error detection unit, numeral 216 denotes a control unit, numeral 217 denotes a retransmission request sending unit, and numeral 218 denotes a signal line.

Figure 4A:
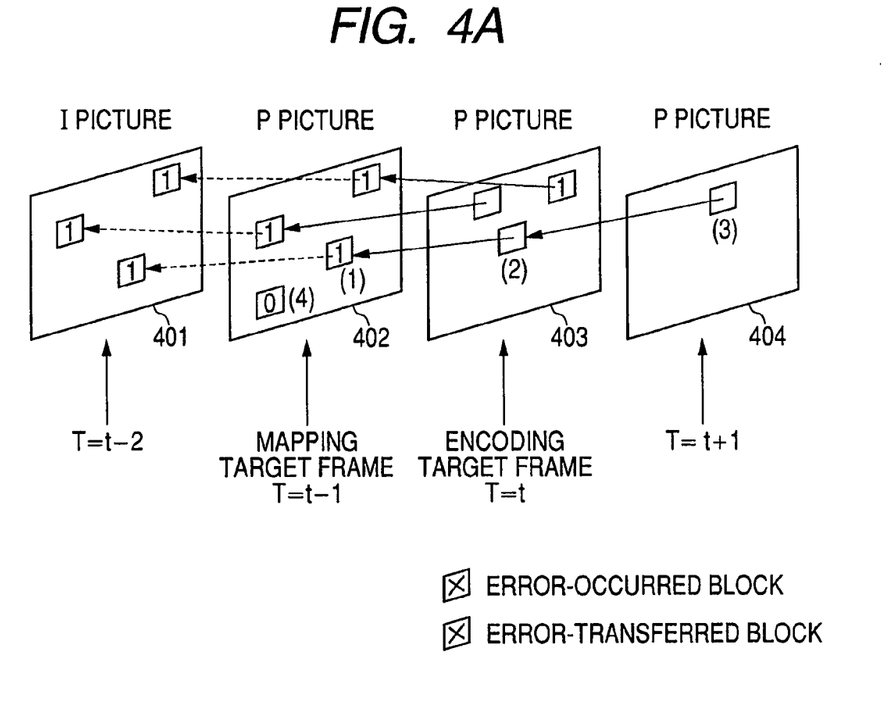
FIGS. 4A and 4B are diagrams for explaining the process of judging whether or not to execute a retransmission request, according to the embodiment of the present invention.
Figure 4B:
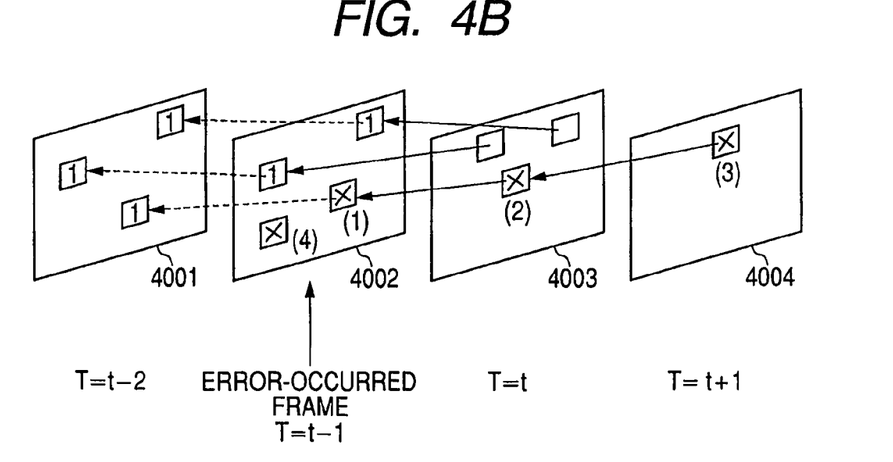

FIG. 4A is the diagram showing examples of the state of the motion compensation prediction concerning an encoding target frame 403 and the frames located before and after the encoding target frame 403 (in display order) on the transmission side (encoding side) and the reference map, and FIG. 4B is the diagram showing an example of the error propagation which is on the assumption that an error is detected in a frame 4002 (corresponding to a frame 402 of the encoding target image shown in FIG. 4A) on the reception side (decoding side). Incidentally, in FIGS. 4A and 4B, numerals 401, 404 and 4001 denote frames respectively.

Subsequently, the process to be executed on the decoding side (reception side) will be explained.

In FIG. 2, the data which was transmitted from the reception data input terminal 201 through the transmission path is input to the reception unit 202. In regard to the data which was input to the reception unit 202, the transmission package such as the transport stream or the like is released, the acquired data is encoded on the transmission side, the encoded data is then multiplexed with arbitrary additional data, and the multiplexed data is stored in the reception buffer 203.

Besides, it should be noted that the reception buffer 203 is the memory of ring buffer type, as well as the transmission buffer 110 in the first embodiment.

The multiplexed data which have been stored in the reception buffer 203 are appropriately read in writing (storing) order under the control of the control unit 216, and the read data are input to the multiplexing release unit (DEMUX) 204.

In the multiplexing release unit 204, the process of dividing the multiplexed data into the encoded frame (i.e., an encoded moving image signal) and the reference map is executed.

The encoded frame which was subjected to the dividing process in the multiplexing release unit 204 is then input to the decoding unit 212 and the error detection unit 215.

On the other hand, the reference map which was subjected to the dividing process in the multiplexing release unit 204, as well as the encoded frame, is then input to the conversion unit 213. Thus, in the conversion unit 213, the reference map in the format shown in FIG. 3A of the first embodiment is converted into the reference map, shown in FIG. 3B of the first embodiment, from which only the portion corresponding to the reference map has been extracted.

Subsequently, the reference map which was subjected to the conversion process in the conversion unit 213 is stored in the reference map buffer 214. In consequence, the reference map which has been stored in the reference map buffer 214 is referred by the control unit 216 as circumstances demand.

Incidentally, in regard to the encoded frame which was input to the decoding unit 212, the variable length code is decoded by the VLD unit 205, whereby a quantization orthogonal transformation coefficient is output.

Then, the output quantization orthogonal transformation coefficient is input to the inverse quantization ($Q^1$) unit 206. Subsequently, in the inverse quantization ($Q^1$) unit 206, the input quantization orthogonal transformation coefficient is subjected to an inverse quantization process, whereby an orthogonal transformation coefficient is output.

Subsequently, the output orthogonal transformation coefficient is input to the inverse orthogonal transformation {or the inverse discrete cosine transformation (IDCT)} unit 207. In the IDCT unit 207, the input orthogonal transformation coefficient is converted into the moving image signal (in the case where the encoding mode of the encoding target frame is directed to the intra-frame encoding) or the difference moving image signal (in the case where the encoding mode of the encoding target frame is directed to the inter-frame prediction encoding or the intra-frame prediction encoding).

Incidentally, under the control of the control unit 216, it is judged whether the encoding mode is directed to the moving image signal (i.e., the intra-frame encoding) or the difference moving image signal which was converted by the IDCT unit 207.

If it is judged that the encoding mode is directed to the intra-frame encoding, the SW 208 is switched to the side "Intra" under the control of the control unit 216. Thus, the moving image signal which was subjected to the inverse orthogonal transformation bypasses the motion compensation unit 209 and is stored in the frame memory 210. At the same time, the moving image signal which was subjected to the inverse orthogonal transformation is also output to the output terminal 211 as the moving image signal capable of being displayed.

On the other hand, if it is judged that the encoding mode is directed to the inter-frame prediction encoding or the intra-frame prediction encoding, the SW 208 is switched to the side "Inter" under the control of the control unit 216. Thus, the moving image signal which was subjected to the inverse orthogonal transformation is input to the motion compensation unit 209. Then, under the control of the control unit 216, the motion compensation unit 209 reads the reference frame (already-decoded precedent frame) of the difference moving image signal subjected to the inverse orthogonal transformation, according to the motion vector corresponding to the difference moving image signal subjected to the inverse orthogonal transformation. Subsequently, under the control of the control unit 216, the read reference frame is added to the difference moving image signal, whereby the decoded moving image signal is generated and output. Then, the decoded moving image signal which was output from the motion compensation unit 209 is stored in the frame memory 210 and, at the same time, output from the output terminal 211 as the moving image signal capable of being displayed, as well as the case where the encoding mode is directed to the intra-frame encoding.

Next, the operation which is executed on the decoding side according to the present embodiment in the case where an error occurs in the encoded data which was input through the input terminal 201 will be explained with reference to FIG. 4B.

First, it is assumed that the error occurs in the block (1) on the frame 4002 shown in FIG. 4B. Here, in the example shown in FIG. 4B, the block (1) on the frame 4002 is referred from the block (2) on a frame 4003, and the block (2) on the frame 4003 is referred from the block (3) on a frame 4004. For this reason, if the error which occurred on the block (1) on the frame 4002 shown in FIG. 4B is not corrected, the error in the block (1) on the frame 4002 is sequentially propagated to the block (2) on the frame 4003 and further the block (3) on the frame 4004. In other words, turbulence of image occurs over more than two frames.

On the other hand, it is assumed that the error occurs in the block (4) on the frame 4002 shown in FIG. 4B. Here, in the example shown in FIG. 4B, the block (4) on the frame 4002 is not at all referred from another frame (or another block). For this reason, even if the error which occurred on the block (4) on the frame 4002 shown in FIG. 4B is not corrected, the error is limited only in the block (4) on the frame 4002. In other words, turbulence of image is limited in only one frame.

Incidentally, the encoded frame which was divided and output in the multiplexing release unit 204 is then input to the decoding unit 212 and the error detection unit 215.

Then, it is assumed that the error detection unit 215 detects the errors in the blocks (1) and (4) on the frame 4002 shown in FIG. 4B (or the frame 402 shown in FIG. 4A).

Subsequently, the error detection unit 215 notifies the control unit 216 of the location information (the frame number and the coordinates of the block where the error occurred) of the error blocks (1) and (4). The control unit 216 which received the location information of the error blocks refers to the map buffer 214 of the reference map and thus detects the numeric values on the reference map corresponding to the notified location information of the error blocks (1) and (4).

That is, by detecting the numeric values on the reference map corresponding to the detected error blocks (1) and (4), the control unit 216 judges whether or not the blocks (that is, the blocks (1) and (4) shown in FIG. 4B) designated by the location information are referred from another frame or block.

Incidentally, it should be noted that to judge whether or not the blocks corresponding the location information of the error blocks (1) and (4) are referred from another frame or block is executed by judging, with the control unit 216, the numeric values (see FIG. 3A) on the reference map corresponding to the error blocks in the error frame.

In the example shown in FIG. 4B, since the numeric value on the reference map corresponding to the error block (that is, the block (4) in the frame 4002) is "0", the retransmission request in regard to the error in the block (4) shown in FIG. 4B is discarded, that is, any retransmission is not executed. On the other hand, since the numeric value on the reference map is "1" in regard to the block (1) shown in FIG. 4B, the retransmission request in regard to the error in the block (1) shown in FIG. 4B is generated by the retransmission request sending unit 217, and the generated retransmission request is actually sent to the transmission side (encoding side).

Figure 8:
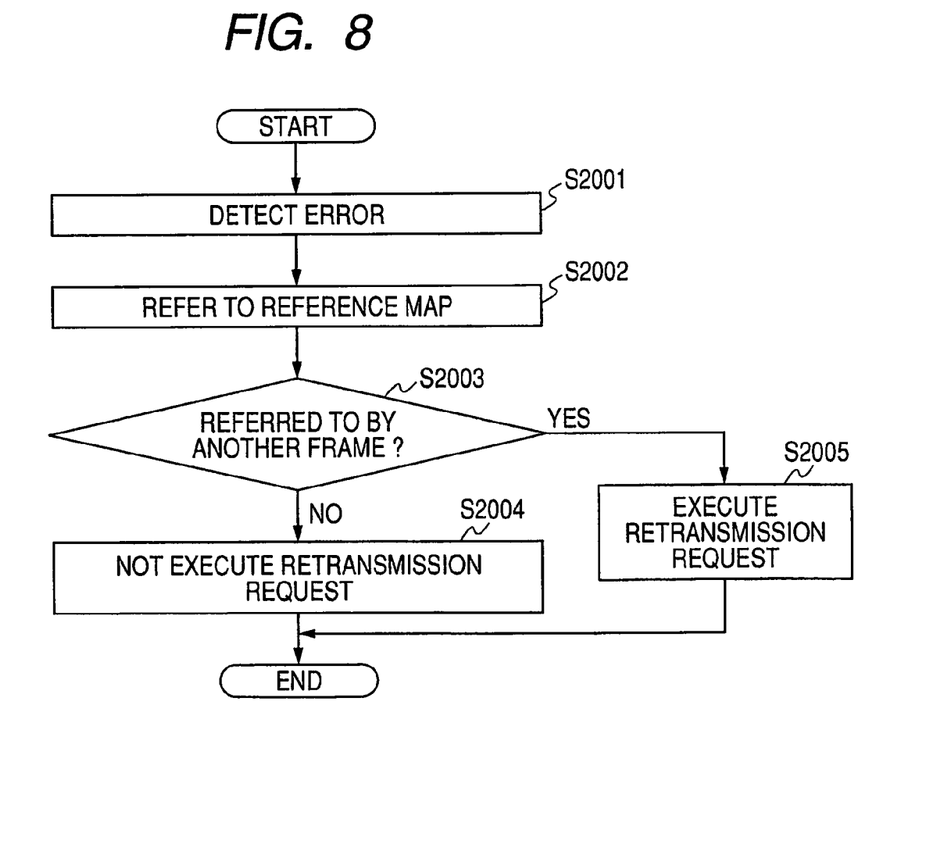
FIG. 8 is a flow chart showing the process to be executed when an error occurs in the decoding device according to the embodiment of the present invention.

FIG. 8 is the flow chart showing the process to be executed by the decoding device when the error occurs. Initially, in a step S2001, the occurred error is detected. Then, in a step S2002, the reference map of the error block is referred. Subsequently, it is judged based on the referred result in the step S2002 whether or not the error block is referred from another frame or block (step S2003). Here, if it is judged that the error block is referred from another frame or block (that is, YES in the step S2003), the retransmission request is sent (step S2005). On the other hand, if it is judged that the error block is not referred from another frame or block (that is, NO in the step S2003), any retransmission request is not sent (step S2004).

In the present embodiment, the retransmission request is sent by using the line different from the line to be used in the transmission of the moving image signal (encoded frame). However, the present invention is not limited to this. That is, if the transmission unit and the line to be used have the form by which the retransmission request can be received on the reception side, it is possible to arbitrarily use any types of the transmission unit and the line.

According to the present embodiment, the reference map which represents whether or not a certain block is referred by another block or frame is generated on the transmission side, and the generated reference map is transmitted to the reception side together with the encoded image data. For this reason, it is possible to effectively reduce the process which is to be executed on the reception side.

According to the present embodiment, in the case where the error occurred on the reception side, the corresponding reference map is referred. Therefore, it is possible, without executing a complicated calculation process, to judge whether or not the block in which the error occurred is referred from another block, that is, whether or not the error which occurred in one block propagated to another block. Moreover, according to the present embodiment, it is possible to select only the block of which the error occurred therein is spread or propagated to another block or frame and thus execute the retransmission request in regard to only the selected block. For this reason, it is possible to reduce the traffic amount on the data transmission path. In addition, it is possible to shorten the time from the error detection to the retransmission request.

According to the present embodiment, in the case where the retransmission request which was sent from the reception side is received on the transmission side, it is clear that the block to which the retransmission request was issued is the block from which the error is spread or propagated to another block. For this reason, the transmission side immediately executes the retransmission in accordance with the retransmission request, whereby it is possible to shorten the time from the reception of the retransmission request on the transmission side to the actual execution of the retransmission.

According to the present embodiment, at the time when the retransmission request is received on the transmission side, it is judged on this side whether or not the encoded frame which is to be retransmitted hereafter to the reception side is correctly decoded and displayed in correct order temporarily on the reception side. Therefore, if it is judged that the frame which is retransmitted in response to the retransmission request is discarded, not correctly decoded, or not displayed in correct order on the reception side, the retransmission in regard to the relevant retransmission request is not actually executed. As a result, it is possible to avoid that the traffic amount on the data transmission path increases because the retransmission is executed needlessly.

In the present embodiment, the reference map which represents whether or not a certain block is referred by another block or frame is explained. However, the present invention is not limited to this. That is, of course, it is also possible to use another information, instead of the reference map, which represents whether or not a certain block is referred by another block or frame.

According to the present embodiment, it is possible to reduce the process which is to be executed on the reception side. In addition, it is possible to shorten the time from the occurrence of the error to the sending of the retransmission request.

(Other Embodiments)

It is needless to say that the object of the present invention is achieved in a case where a recording medium (or a storage medium) which stores therein program codes of software to realize the functions of the above embodiment is supplied to a system or a device, and thus a computer (a CPU or an MPU) in the system or the device reads and executes the program codes which have been stored in the recording medium. In this case, the program codes themselves which were read out of the recording medium realize the functions of the above embodiment. For this reason, the recording medium which has stores therein these program codes constitutes the present invention.

Further, it is needless to say that the present invention includes not only the case where the functions of the above embodiment are realized by executing the readout program codes with the computer, but also a case where an OS (operating system) or the like which runs on the computer executes a part or all of the actual processes on the basis of the instructions of the program codes and thus the functions of the above embodiment are realized by the relevant processes.

Furthermore, it is needless to say that the present invention also includes a case where, after the program codes which were read out of the recording medium are written into the memory which is provided on the function expansion board inserted in the computer or in the function expansion unit connected to the computer, the CPU or the like which is provided in the function expansion board or the function expansion unit executes a part or all of the actual processes on the basis of the instructions of the relevant program codes, and thus the functions of the above embodiment are realized by the relevant processes.

Incidentally, in the case where the present invention is applied to the above recording medium, the program codes which correspond to the processes in the above-explained flow charts are stored or recorded on the relevant recording medium.

In other words, the foregoing description of the embodiments has been given for illustrative purposes only and not to be construed as imposing any limitation in all respects.

The scope of the present invention is, therefore, to be determined solely by the following claims and not limited by the text of the specifications and alterations made within the scope equivalent to the scope of the claims fall within the true spirit and scope of the present invention.

This application claims priority from Japanese Patent application No. 2005-189939 filed Jun. 29, 2005, which is hereby incorporated by reference herein.

The invention claimed is:

1. An image processing device comprising:
a reception unit configured to receive (1) encoded image data encoded in units of blocks of image data and (2) reference information representing whether or not a block of the image data is selected as reference image data when another block is encoded;
a judgment unit configured to judge from the received reference information, in a case where an error occurs in the block, whether or not the block in which the error occurs is selected as reference image data when the another block is encoded; and
a retransmission request unit configured to execute the retransmission request for the block in a case where it is judged by the judgment unit that the block in which the error occurs is selected as reference image data when another block is encoded, and to not execute the retransmission request for the block in a case where it is judged by the judgment unit that the block in which the error occurs is not selected as reference image data when another block is encoded.

2. An image processing method comprising:
   a reception step of receiving (1) encoded image data encoded in units of blocks of image data and (2) reference information representing whether or not a block of the image data is selected as reference image data when another block is encoded;
   a judgment step of judging from the received reference information, in a case where an error occurs in the block, whether or not the block in which the error occurs is selected as reference image data when another block is encoded; and
   a retransmission request step of executing the retransmission request for the block in a case where it is judged in the judgment step that the block in which the error occurs is selected as reference image data when another block is encoded, and not executing the retransmission request for the block in a case where it is judged by the judgment step that the block in which the error occurs is not selected as reference image data when another block is encoded.

3. A non-transitory computer-readable storage medium which retrievably stores therein a computer program to be used to cause a computer to execute an image processing method comprising:
   a reception step of receiving (1) encoded image data encoded in units of blocks of image data and (2) reference information representing whether or not a block of the image data is selected as reference image data when another block is encoded;
   a judgment step of judging from the received reference information, in a case where an error occurs in the block, whether or not the block in which the error occurs is selected as reference image data when another block is encoded; and
   a retransmission request step of executing the retransmission request for the block in a case where it is judged by the judgment step that the block in which the error occurs is selected as reference image data when another block is encoded, and not executing the retransmission request for the block in a case where it is judged by the judgment step that the block in which the error occurs is not selected as reference image data when another block is encoded.

* * * * *